July 4, 1944.　　　J. B. MURRAY　　　2,353,059
FILING APPARATUS
Filed June 21, 1941　　　4 Sheets-Sheet 2

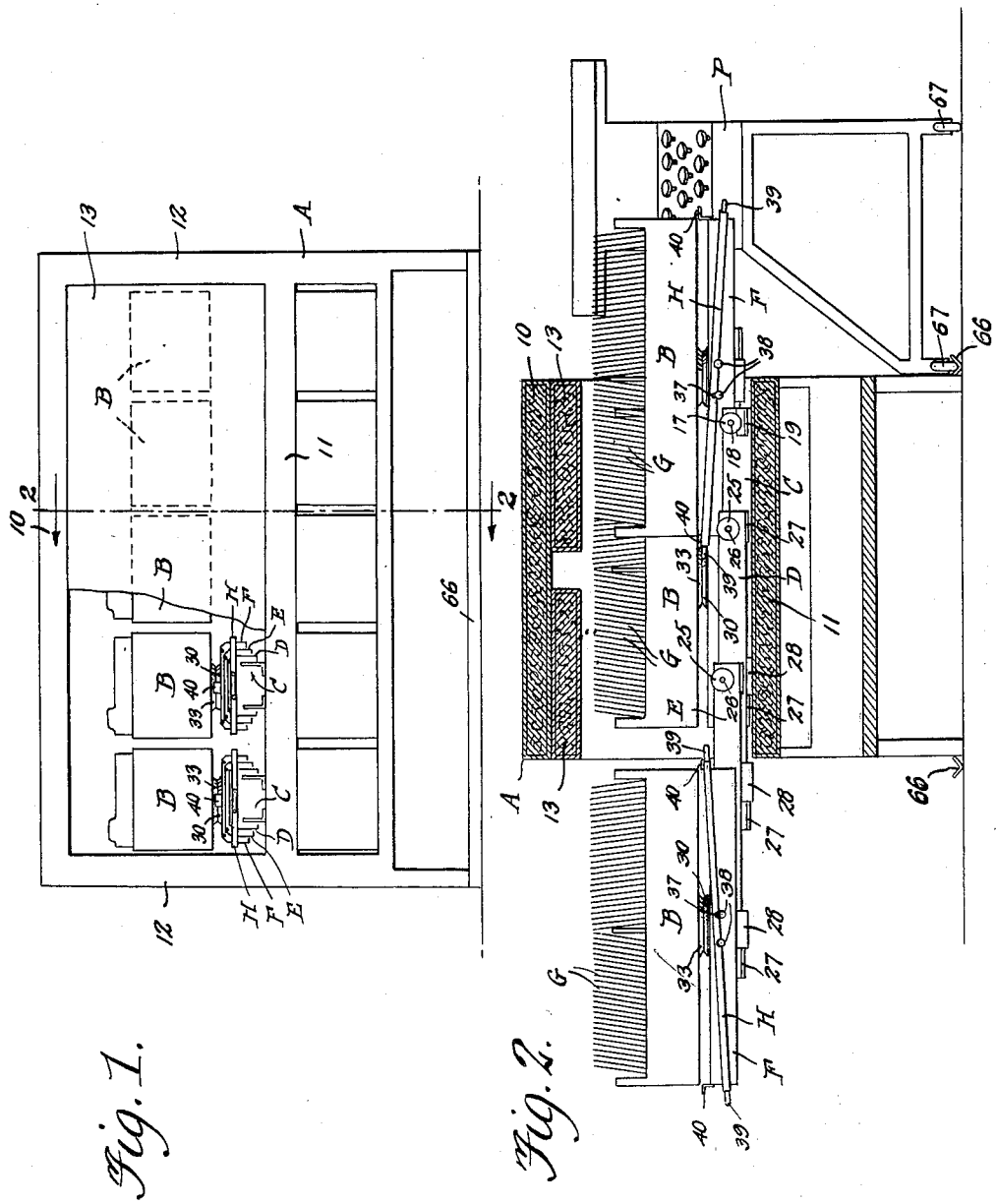

INVENTOR.
JAMES B. MURRAY
BY
Clark & Ott
ATTORNEYS

July 4, 1944.  J. B. MURRAY  2,353,059
FILING APPARATUS
Filed June 21, 1941  4 Sheets-Sheet 3

INVENTOR.
JAMES B. MURRAY
BY Clark & Ott
ATTORNEYS

July 4, 1944.                J. B. MURRAY                2,353,059
                            FILING APPARATUS
                         Filed June 21, 1941          4 Sheets-Sheet 4
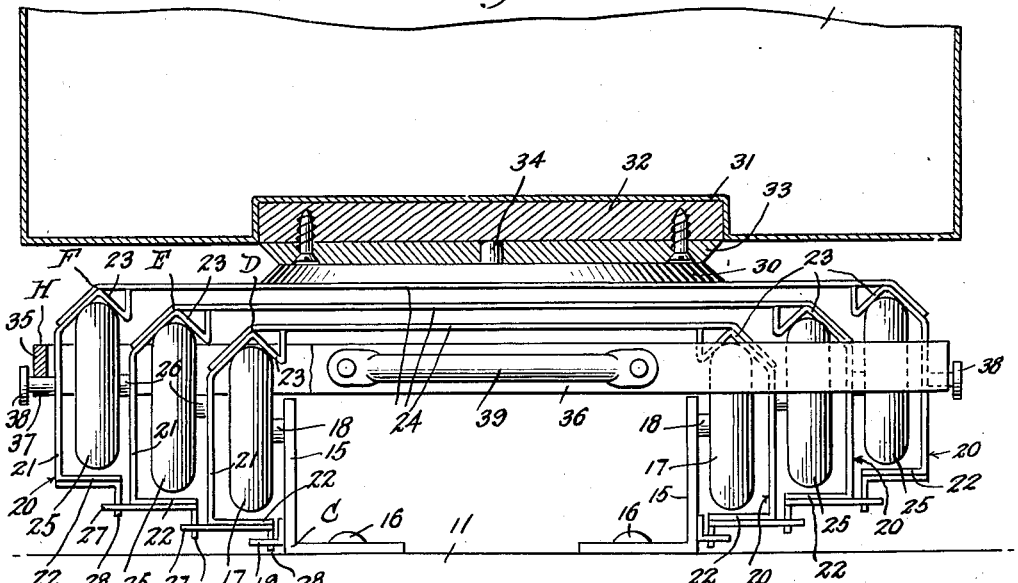
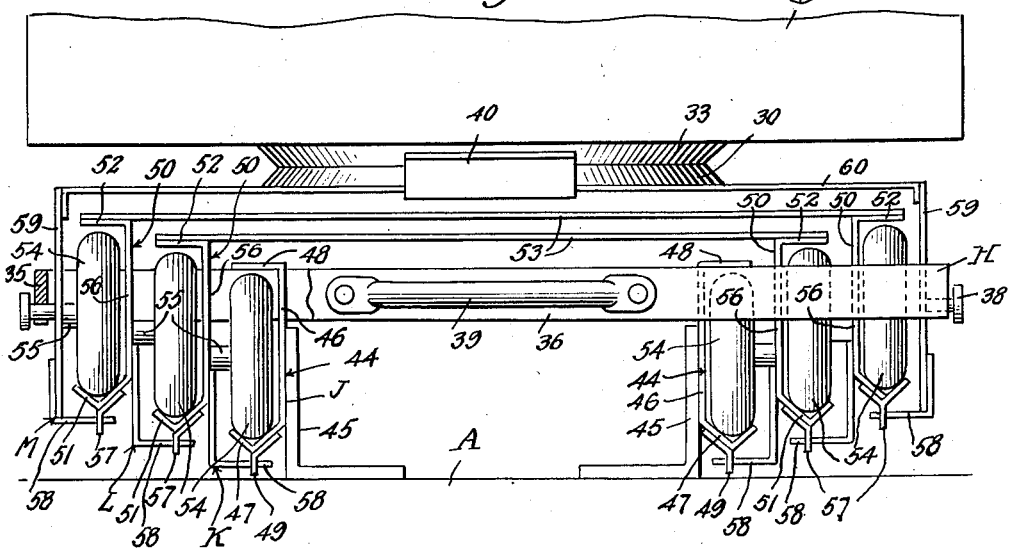
INVENTOR.
JAMES B. MURRAY
BY
Clark P Ott
ATTORNEYS Patented July 4, 1944

2,353,059

UNITED STATES PATENT OFFICE 2,353,059

FILING APPARATUS

James B. Murray, Garden City, N. Y.

Application June 21, 1941, Serial No. 399,091

9 Claims. (Cl. 45—2)

This invention relates to filing apparatus of the slidable or rollable drawer type and the same has particular reference to an apparatus of the said character in which the drawers are mounted for translatory and rotatory movements so that the same may be moved longitudinally in either direction and rotated to reverse the relative positions of the ends thereof in order that access may be had to both ends of the drawer from either side of the apparatus.

The invention has to do with a filing apparatus primarily adapted for use by banking institutions as a repository for canceled checks or vouchers arranged in individual folders in associated relation with the current monthly statements of the depositors and to which almost continuous reference is made for the purpose of filing the checks or vouchers and the posting of the same on the statements. In order that the apparatus may be simultaneously used for the filing and posting operations as well as for ready examination by tellers and officials for determining the status of depositors accounts, the drawers are mounted for movement in opposite directions and for reversal so that access may be gained to the opposite ends thereof from either side of the apparatus.

The invention more particularly comprehends a filing apparatus including one or more filing drawers each mounted on a plurality of nested rollable slides having limited guided rolling movement with relation to each other and with the rollers of a guide track fixed to a support for projecting the drawers in opposite directions beyond the sides of the support and which drawers are rotatably affixed to one of the slides for reversing the relative positions of the ends of the drawers when in projected relation.

The invention further includes a retaining means for each drawer, manually operable from either end thereof for holding the drawers in normally retracted position relative to the support.

With the foregoing and other objects in view, reference is now made to the following specification and accompanying drawings in which there is illustrated the preferred form thereof.

In the drawings:

Fig. 1 is a side view of a filing apparatus constructed in accordance with the invention illustrating the side doors in closed relation and partially broken away.

Fig. 2 is a vertical transverse sectional view taken approximately on line 2—2 of Fig. 1 illustrating a posting machine associated therewith and with one of the drawers in normal, retracted position, another in partially projected position and a third in fully projected position to permit of reversal thereof.

Fig. 8 is an enlarged fragmentary front view of one of the drawers and the mounting therefor with the retaining frame and drawer partially broken away.

Fig. 9 is a similar view illustrating a modification of the mounting means.

Figure 3:
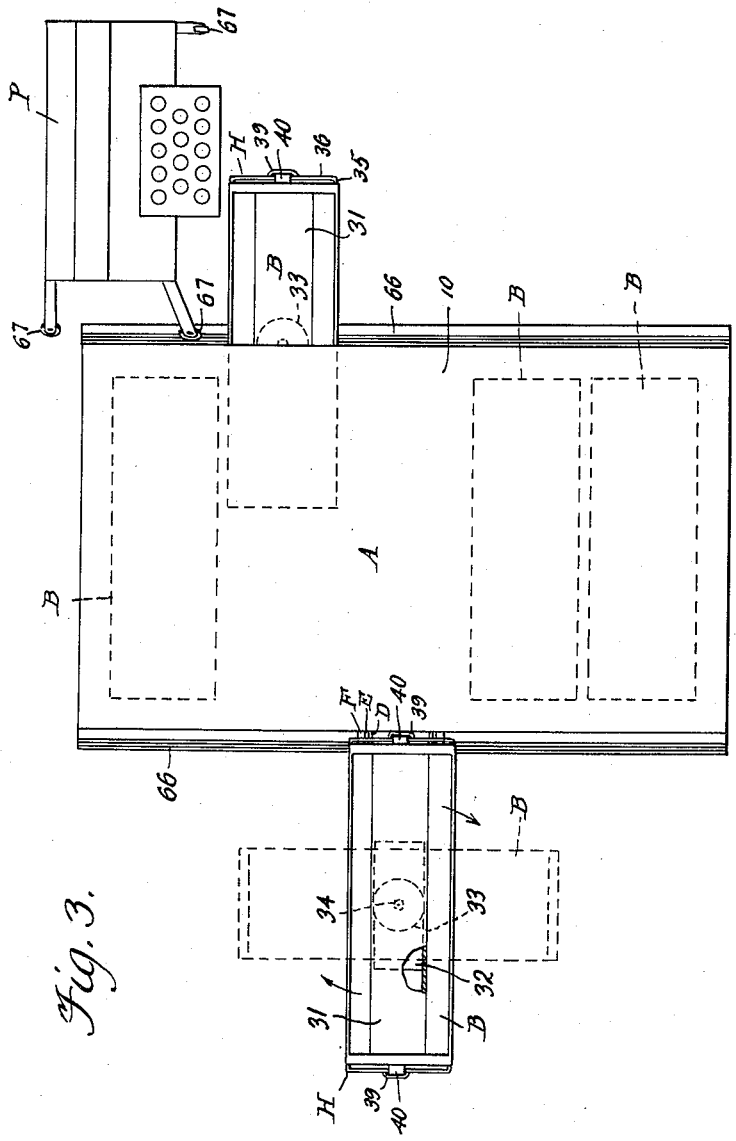
Fig. 3 is a top plan view of the filing apparatus as illustrated in Fig. 2.
Figure 4:
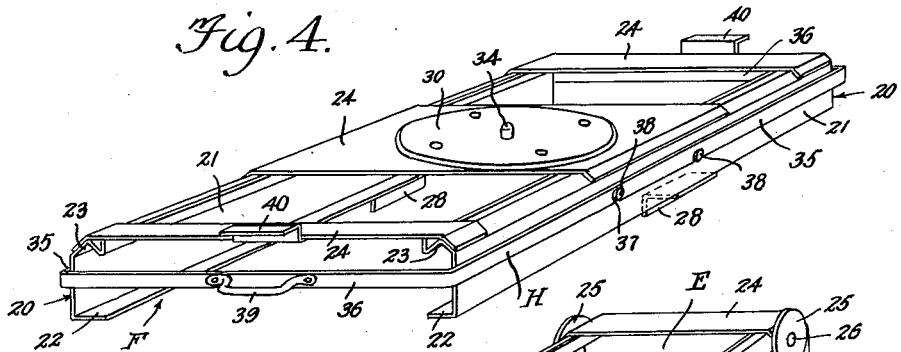
Figs. 4, 5, 6 and 7 are perspective views of the slide members and fixed guide track in separated juxtaposition.
Figure 5:
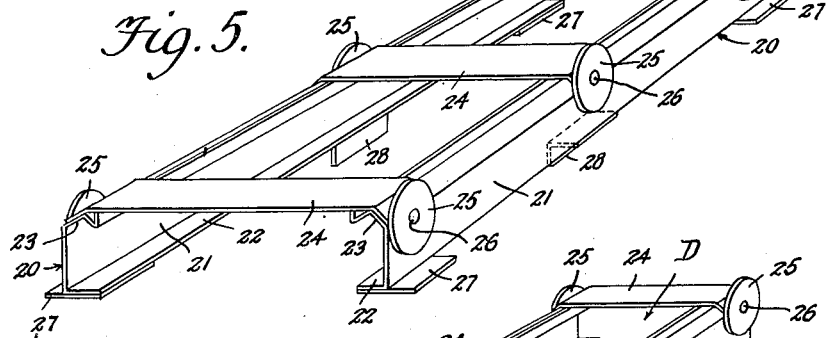
Figure 6:
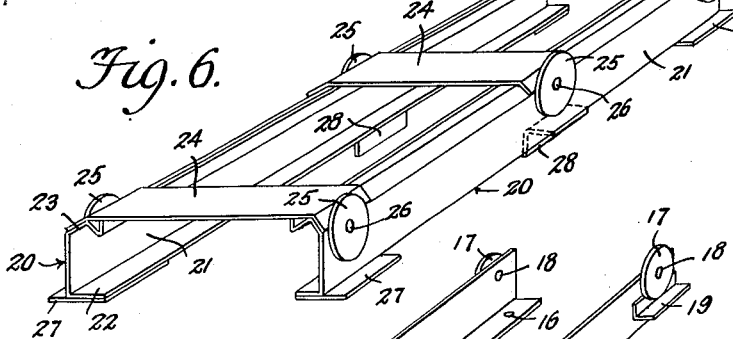
Figure 7:
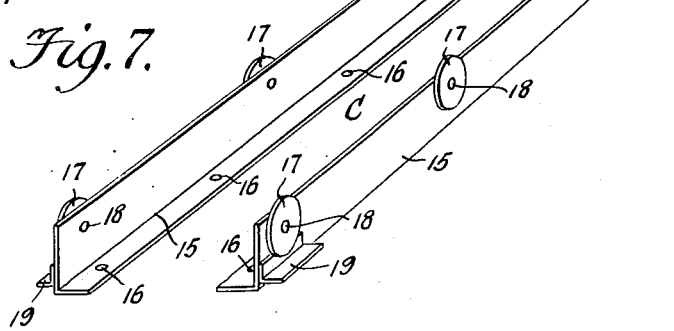

Referring to the drawings by characters of reference, the filing apparatus includes a support designated generally by the reference character A, which in the present instance is preferably in the form of a cabinet of fire-proof construction having top and bottom walls 10 and 11 and end walls 12 to provide open opposite sides which are adapted to be closed by side doors 13 which are mounted in any suitable manner for movement from a closed position fitted within the open sides to an open position underlying the top wall.

The cabinet or support A has associated therewith one or more drawers B, a plurality being shown in the present instance, which are mounted in side by side relation for translatory endwise movement thereof in either direction transversely of the support so as to be projected from the opposite sides of the cabinet.

The mounting for each drawer consists of a guide track C composed of a pair of parallel angulated rails 15 fixed to the support A in any desired manner and as shown the same are secured by rivets, bolts 16, or equivalent fastening means, to the upper surface of the bottom wall 11 and extending thereacross. The upstanding flanges of the rails 15 are provided with longitudinally spaced rollers 17 mounted on spindles 18 projecting outwardly from the outer faces of said flanges with the rollers disposed exterior of said upstanding flanges and projecting above the upper edges thereof. Each rail is provided adjacent its opposite ends with an outwardly protruding abutment lug 19 for a purpose to be hereafter set forth.

The mounting further includes a plurality of superimposed nested rollable slide members D, E and F, each of which includes a framework of substantially identical construction. The framework of each slide member consists of a pair of longitudinal channel-shaped side stiles 20 which stiles are each formed with a vertical web 21, a lower inwardly directed base flange 22 and an upper inwardly directed inverted V-shaped flange 23 defining a roller guideway. The side stiles are secured together in fixed spaced parallel relation by connecting means herein illustrated as consisting of a plurality of transverse strips 24 spaced apart longitudinally of the stiles 20 and with the opposite ends of said strips overlying the stiles and secured to the upper flanges 23 thereof.

The webs 21 of the stiles of the intermediate slide members D and E are provided with longitudinally spaced rollers 25 mounted on spindles 26 projecting outwardly from the outer faces of the webs with the rollers disposed exterior thereof and projecting above the upper edges of the stiles. The webs 21 of the stiles of the said intermediate slide members D and E are provided adjacent the opposite ends with outwardly protruding abutment lugs 27, while the stiles of the slide members D, E and F are provided with depending stop lugs 28 intermediate the ends thereof and depending from the inner free edges of the base flanges 22.

The side stiles 20 of the innermost or lower intermediate slide member D are so spaced apart as to straddle the upstanding flanges of the rails 15 of the guide track C with the inwardly directed inverted V-shaped flanges 23 engaging the rollers 17 of the guide track C for guided longitudinal rolling movement in opposite directions with reference thereto. This disposes the inwardly directed base flanges 22 of said side stiles beneath the rollers 17 to serve as guard means for preventing upward movement and vertical separation of the slide member D from the guide track C. This also disposes depending stop lugs 28 of the slide member D in alignment with the abutment lugs 19 of the guide track C for limiting the longitudinal relative movement of the slide member D in opposite directions with reference to the guide track C and serves to prevent complete withdrawal of said slide member from the guide track.

The side stiles 20 of the upper intermediate slide member E are so spaced apart as to straddle the side stiles of the innermost or lower intermediate slide member D with the V-shaped flanges 23 thereof engaging the rollers 25 of the slide member D for guided longitudinal rolling movement in opposite directions of the slide member E with reference to the slide member D. This positions the inwardly directed base flanges 22 of the side stiles of the slide member E beneath the rollers 25 of the slide member D to serve as a guard means for preventing upward movement and vertical separation of the slide members D and E. In this instance, the depending stop lugs 28 of the slide member E are disposed in alignment with the abutment lugs 27 of the slide member D for limiting the longitudinal relative movement of the slide member E in opposite directions with reference to the slide member D thus functioning to prevent complete withdrawal of the slide member E from the slide member D.

The side stiles 20 of the uppermost or outer slide member F are spaced apart such a distance as to straddle the side stiles 20 of the slide member E with the inverted V-shaped flanges 23 engaging the rollers 25 of the slide member E for mounting the slide member F for guided longitudinal rolling movement in opposite directions with reference thereto. This arrangement locates the inwardly directed base flanges 22 of the side stiles of the slide member F beneath the rollers 25 of the slide member E so as to serve as guard means for preventing upward movement and vertical separation of the slide members E and F. The depending stop lugs 28 of the slide member F are thereby disposed in alignment with the abutment lugs 27 of the slide member E so as to limit the longitudinal relative movement of the slide member F in opposite directions with reference to the slide member E, while also serving as means for preventing complete withdrawal of the slide member F from the slide member E.

In order to provide means for associating each drawer B with its mounting for turning movement with reference thereto to reverse the positions of the ends of the drawer with reference to the mounting, the uppermost or outer slide member F is provided with a turntable section 30 which is carried by the upper surface of and secured to the intermediate transverse strip 24 thereof. The bottom wall of the drawer B is formed with a longitudinally extending upwardly offset medial portion providing a channel 31 within which is frictionally fitted for detachable association therewith a fillerstrip 32 preferably of wood. A mating turntable section 33 is secured centrally to the underside of the filler strip and bears upon the turntable section 30 and a king pin 34 extends concentrically through the said turntable sections to center the same and associate the drawer with the mounting for rotatory movement. The checks, vouchers, depositors' statements, folders or other contents indicated generally by the reference character G are preferably arranged in each drawer so that approximately half face outwardly toward one end of the drawer and the remainder face outwardly toward the opposite end.

By virtue of the foregoing construction and arrangement, it is apparent that the drawers B are mounted in the cabinet for movement in opposite directions to project the same beyond the opposite sides of the cabinet so that access may be obtained thereto from either side thereof and when any one of the drawers is fully withdrawn from either side of the cabinet, the same may be turned upon the turntable for reversing the relative positions of the ends of the drawer so that access may be conveniently gained to the contents G of either end of the drawer from either side of the cabinet.

The mounting for each drawer is provided with means for retaining the same in normally retracted position within the cabinet and as illustrated, said means consists of a rectangular retaining frame H which includes opposite longitudinal side leads 35 and opposite transverse end leads 36, the frame being of a size and shape to embrace the uppermost or outer slide member F together with the intermediate slide members D and E when nested therewith as well as the guide track C when the nested slide members are in normally retracted position. The lower edges of the side leads 35 are each provided with a pair of notches 37 which are engaged by a pair of headed studs 38 projecting outwardly from each of the opposite sides of the webs 21 of the side stiles 20 of the slide member F. The studs of each pair are spaced longitudinally of the side stile and arranged equi-distantly on opposite sides of the longitudinal center thereof. The opposite transverse end leads 36 of the frame B are each provided with an outwardly directed handle 39 adapted to be grasped for the purpose of depressing either end of the retaining frame H so as to rock the same longitudinally on the near stud of each pair as fulcrum means thereby elevating the opposite end of the frame so as to free the slide members from each other and the guide track for outward relative longitudinal movement, the handles 39 also serving as pull elements for drawing the drawers outwardly.

For the purpose of limiting the rocking movement of the retaining frame H and for gaging the upward movement of the ends of the frame, the opposite end strips 24 of the slide member F are provided with angulated gage stops 40 which are respectively disposed in the path of movement of the opposite end leads 36.

In the modified form of mounting means for the drawers illustrated in Fig. 9 of the drawings, the drawers are each mounted in the cabinet for movement in opposite directions to project the same beyond the opposite sides thereof so that access may be obtained to the cabinet from either side and when any one of the drawers is fully withdrawn from either side of the cabinet, the same may be turned for reversing the relative position of the ends of the drawers so that access may be conveniently gained to the contents thereof from either end of the drawers from either side of the cabinet.

In this instance, the mounting means for each drawer consists of a guide track J composed of a pair of parallel channel-shaped side stiles 44 secured to the outer faces of longitudinally extending angulated frame members 45 affixed to the support A in any desired manner. The side stiles 44 are each formed with an upstanding vertical web 46, a lower outwardly directed V-shaped flange 47 defining a fixed roller guide track and an upper outwardly directed top flange 48. The side stiles 44 are each provided adjacent the opposite ends thereof with an abutment lug 49 depending from the V-shaped flange 47. The said mounting further includes a plurality of superimposed nested rollable slide members K, L and M, the slide members K and L each including a frame work of substantially identical construction consisting of a pair of longitudinally extending channel-shaped side stiles 50 each formed with an outwardly directed V-shaped base flange 51 defining a roller guideway and an outwardly directed top flange 52.

The side stiles of the intermediate slide members L and K are secured together in fixed spaced parallel relation by connecting means such as transverse strips 53 similar to the strips 24 of the previously described form of slide members. The said stiles are each provided with rollers 54 preferably corresponding to the number and spacing of the rollers of the slide members in the previous form of mounting, but in this instance the rollers 54 are mounted on spindles 55 which project inwardly from the inner faces of the webs 56 of the said slide members and with the rollers disposed exteriorly of the webs and projecting below the V-shaped base flanges thereof. The side stiles 50 are also provided adjacent the opposite ends thereof with abutment lugs 57 depending from the base flanges 51 thereof, and depending from the webs 56 intermediate the ends thereof are inwardly directed stop lugs 58.

The outermost or upper slide member M includes a framework consisting of a pair of parallel side stiles 59 which are secured together in fixed spaced parallel relation by transverse strips 60 connecting the upper edge thereof and preferably corresponding to the number and spacing of the strips 24 of the previously described form of slide members. The said side stiles are similarly provided with rollers 54 which are mounted on spindles 55 projecting inwardly from the inner faces thereof and which protrude below the lower edges of the said stiles with the rollers disposed interiorly thereof and depending from each side stiles intermediate the ends thereof is an inwardly directed stop lug 58.

The side stiles 50 of the innermost or lower intermediate slide member K are spaced apart so as to straddle the guide track J with the rollers 54 thereof engaging the V-shaped flanges 47 of the guide track J for guided longitudinal rolling movement in opposite directions with reference thereto and with the outwardly directed top flanges 48 of the said guide track projecting over the rollers 54 to serve as guard means for preventing upward movement and vertical separation of the slide member K from the guide track J. This disposes the stop lugs 58 of the slide member K in alignment with the abutment lugs of the guide track J for limiting the longitudinal relative movement of the slide member K in opposite directions with reference to the guide track J and serves to prevent complete withdrawal of the slide member K from the said guide track.

The side stiles 50 of the upper intermediate slide member L are likewise spaced apart a distance so as to straddle the innermost or lower intermediate slide member K with the rollers 54 of the said slide member L engaging the V-shaped base flange 51 for guided longitudinal rolling movement in opposite directions with reference to the slide member K and with the top flange 52 thereof projecting over the rollers 54 to serve as guard means to prevent upward movement and vertical separation of the slide member L from the slide member K. This disposes the depending and inwardly directed stop lug 58 of the slide member L in alignment with the abutment lugs 57 of the slide member K for limiting the longitudinal relative movement of the slide member L in opposite directions with reference to the slide member K and serves to prevent complete withdrawal of said slide member L from the slide member K.

The side stiles 59 of the outermost or upper slide member M are similarly spaced apart a sufficient distance so that the same straddle the upper intermediate slide member L with the rollers 54 of the slide member M engaging the V-shaped flanges 51 of the slide member L for guided longitudinal rolling movement of the slide member M in opposite directions with relation to the slide member L. This also positions the depending and inwardly directed stop lugs 58 of the slide member M in alignment with the abutment lugs 57 of the slide member L for limiting the longitudinal relative movement of the slide member M in opposite directions with relation to the slide member L and serves to prevent complete withdrawal of said slide member M from the slide member L.

In this form of mounting the drawer B is similarly arranged upon the outermost or upper slide member thereof by means of turntable sections 30 and 33 for turning movement to reverse the positions of the ends of the drawer when in projected relation and a similar rockable retaining means H is provided for holding the slide members in normally retracted position.

The cabinet is formed with channels 66 extending longitudinally along opposite sides of the base thereof in which channels the wheels 67 of a posting machine P have guided rolling movement to dispose the posting machine P in spaced relation from either side of the cabinet and in juxtaposition to the drawers thereof so that the posting machine operator may conveniently grasp the retaining means of the drawers for withdrawing any one thereof in partially projected relation as illustrated in Figs. 2 and 3, and in convenient position for removing the statements and checks therein for posting, while the opposite side of the cabinet is free for use by tellers and officials for determining the status of a depositor's account and either the posting operator or the officials may withdraw any one of the drawers to its fullest extent for reversing the relation of the ends thereof to gain access to the entire contents of each drawer.

What is claimed is:

1. In a filing apparatus, a supporting structure, a guide track including rails affixed to said supporting structure and extending transversely thereof and having a plurality of spaced rollers rotatably mounted on said rails, a plurality of nested slide members each including longitudinally extending vertically arranged opposite side stiles each having an inverted channel-shaped guideway extending longitudinally along the upper edge thereof and projecting inwardly therefrom and said side stiles each having an inwardly and downwardly projecting lug secured to the lower edge intermediate the ends thereof to define stop elements and certain of said slide members having rollers secured to the outer faces of the side stiles thereof and projecting above the guideways for rolling engagement in the guideways of the adjacent outwardly disposed slide member and certain of said slide members having outwardly projecting lugs secured to the lower edges of the side stiles adjacent the ends thereof and defining abutment elements adapted to be engaged by the stop elements of the adjacent outwardly disposed slide member for limiting the movement of said slide members with relation to each other and the guideways of the innermost slide member having rolling engagement upon the rollers of said guide track for movement of said slide members to and from projected relation with reference to opposite sides of the supporting structure, a file drawer, and means rotatably mounting the file drawer upon the outermost slide member for reversing the relative positions of the ends of the drawer when in projected relation at either side of the supporting structure.

2. In a filing apparatus, a supporting structure, a guide track including rails affixed to said supporting structure and extending transversely thereof and having a plurality of spaced rollers rotatably mounted on said rails, a plurality of nested slide members each including longitudinally extending vertically arranged opposite side stiles each having an inverted channel-shaped guideway extending longitudinally along the upper edge thereof and projecting inwardly therefrom and said side stiles each having an inwardly and downwardly projecting lug secured to the lower edge intermediate the ends thereof to define stop elements and certain of said slide members having rollers secured to the outer faces of the side stiles thereof and projecting above the guideways for rolling engagement in the guideways of the adjacent outwardly disposed slide member and certain of said slide members having outwardly projecting lugs secured to the lower edges of the side stiles adjacent the ends thereof and defining abutment elements adapted to be engaged by the stop elements of the adjacent outwardly disposed slide member for limiting the movement of said slide members with relation to each other and the guideways of the innermost slide member having rolling engagement upon the rollers of said guide track for movement of said slide members to and from projected relation with reference to opposite sides of the supporting structure, a file drawer, means rotatably mounting the file drawer upon the outermost slide member for reversing the relative positions of the ends of the drawer when in projected relation at either side of the supporting structure, a rectangular frame embracing the nested slide members and the guide track and means carried by said outermost slide member supporting said frame intermediate the ends thereof for rocking movement of the frame to raise and lower the opposite ends thereof to thereby free the slide members from nested relation to permit of relative movement thereof in opposite directions to and from projected relation with reference to the supporting structure.

3. In a filing apparatus, a supporting structure, a guide track including rails affixed to said supporting structure and extending transversely thereof and having a plurality of spaced rollers rotatably mounted on said rails, a plurality of nested slide members each including longitudinally extending vertically arranged opposite side stiles provided respectively with an inverted longitudinally extending channel-shaped guideway and transverse means connecting the side stiles together, said side stiles each having an inwardly and downwardly projected lug secured thereto intermediate the ends thereof to define stop elements, the inner slide members each having rollers secured to the outer faces of the side stiles thereof for rolling engagement in the guideways of the adjacent outwardly disposed slide member and the inner slide members each having outwardly projecting lugs secured thereto adjacent the ends thereof and defining abutment elements adapted to be engaged by the stop elements of the adjacent outwardly disposed slide member for limiting the movement of said slide members with relation to each other and the guideways of the innermost slide member having rolling engagement with the rollers of said guide track for movement of said slide members to and from projected relation with reference to opposite sides of the supporting structure, a file drawer, and means rotatably mounting the file drawer upon the outermost slide member for reversing the relative position of the ends of the drawer when in projected relation at either side of the supporting structure.

4. In a filing apparatus, a supporting structure, a guide track including rails affixed to said supporting structure and extending transversely thereof and having a plurality of spaced rollers rotatably mounted on said rails, a plurality of nested slide members each including longitudinally extending vertically arranged opposite side stiles provided respectively with an inverted longitudinally extending channel-shaped guideway and transverse means connecting the side stiles together, said side stiles each having an inwardly and downwardly projected lug secured thereto intermediate the ends thereof to define stop elements, the inner slide members each having rollers secured to the outer faces of the side stiles thereof for rolling engagement in the guideways of the adjacent outwardly disposed slide member and the inner slide members each having outwardly projecting lugs secured thereto adjacent the ends thereof and defining abutment elements adapted to be engaged by the stop elements of the adjacent outwardly disposed slide member for limiting the movement of said slide members with relation to each other and the guideways of the innermost slide member having rolling engagement with the rollers of said guide track for movement of said slide members to and from projected relation with reference to opposite sides of the supporting structure, a file drawer, means rotatably mounting the file drawer upon the outermost slide member for reversing the relative position of the ends of the drawer when in projected relation at either side of the supporting structure, a rectangular frame embracing the nested slide members and the guide track and means carried by said outermost slide member supporting said frame intermediate the ends thereof for rocking movement of the frame to raise and lower the opposite ends thereof to thereby free the slide members from nested relation to permit of relative movement thereof in opposite directions to and from projected relation with reference to the supporting structure.

5. In a filing apparatus, a supporting structure, a guide track affixed to said supporting structure and extending transversely thereof, a plurality of nested slide members having limited guided translatory movement with relation to each other and supported upon said guide track for movement of said slide members to and from projected relation with reference to opposite sides of the supporting structure, a file drawer, and means pivotally mounting the file drawer upon one of the slide members for reversing the relative positions of the ends of the drawer when in projected relation at either side of the supporting structure and means carried by one of said slide members for retaining the slide members from movement relative to each other and to the track, and said means being engageable at opposite ends of said slide member for movement to thereby free the slide members for movement thereof in opposite directions to and from projected relation with reference to the supporting structure.

6. In a filing apparatus, a supporting structure, a guide track affixed to said supporting structure and extending transversely thereof, a plurality of nested slide members having limited guided translatory movement with relation to each other and supported upon said guide track for movement of said slide members to and from projected relation with reference to opposite sides of the supporting structure, a file drawer, and means pivotally mounting the file drawer upon one of the slide members for reversing the relative positions of the ends of the drawer when in projected relation at either side of the supporting structure, a rectangular frame embracing the nested slide members and the guide track to thereby restrain the slide members from movement relative to each other and to the track and means carried by said outermost slide member supporting said frame intermediate the ends thereof for rocking movement of the frame to raise and lower the opposite ends thereof to thereby free the slide members from nested relation to permit of relative movement thereof in opposite directions to and from projected relation with reference to the supporting structure.

7. In a filing apparatus, a supporting structure, a guide track including rails affixed to said supporting structure and extending transversely thereof and having a plurality of spaced rollers rotatably mounted on said rails, a plurality of nested slide members having limited guided movement with relation to each other and supported upon the rollers of said guide track for movement of said slide members to and from projected relation with reference to opposite sides of the supporting structure, a file drawer, means rotatably mounting the file drawer upon one of the slide members for reversing the relative position of the ends of the drawer when in projected relation at either side of the supporting structure and means carried by the outermost slide member for retaining the slide members from movement relative to each other and to the track, and said means being engageable at opposite ends of the outermost slide member for movement to thereby free the slide members for relative movement thereof in opposite directions to and from projected relation with reference to the supporting structure.

8. In a filing apparatus, a supporting structure, a guide track including rails affixed to said supporting structure and extending transversely thereof and having a plurality of spaced rollers rotatably mounted on said rails, a plurality of nested slide members having limited guided movement with relation to each other and supported upon the said guide track for movement of said slide members to and from projected relation with reference to opposite sides of the supporting structure, a file drawer, means rotatably mounting the file drawer upon one of the slide members for reversing the relative position of the ends of the drawer when in projected relation at either side of the supporting structure, a rectangular frame embracing the nested slide members and the guide track to thereby restrain the slide members from movement relative to each other and to the track and means carried by one of said slide members supporting said frame for rocking movement of the frame to raise and lower the opposite ends thereof to thereby free the slide members from nested relation to permit of relative movement thereof with reference to each other and the guide track and in opposite directions to and from projected positions on opposite sides of the supporting structure.

9. In a filing apparatus, a supporting structure, a guide track affixed to said supporting structure and extending transversely thereof, a plurality of nested slide members each including longitudinally extending vertically arranged opposite side stiles having rollers secured to the inner faces thereof, certain of said slide members having channel-shaped guideways extending longitudinally along the lower edges of the side stiles thereof in which guideways the rollers of the adjacent outwardly disposed slide members have rolling engagement, said guideways and said guide track each having downwardly projecting lugs secured to the lower faces adjacent the ends thereof defining abutment elements, said slide members each having a downwardly and inwardly projecting lug secured to the lower edges of the side stiles thereof defining stop elements adapted to engage the abutment elements of the adjacent inwardly disposed slide member for limiting the movement of said slide members with relation to each other and the guideways of the innermost slide member having rolling engagement with the guide track for movement of said slide members to and from projected relation with reference to opposite sides of the supporting structure, a file drawer, and means rotatably mounting the file drawer upon the outermost slide member for reversing the relative positions of the ends of the drawer when in projected relation at either side of the supporting structure.

JAMES B. MURRAY.